(12) United States Patent
Yabe

(10) Patent No.: US 6,711,963 B2
(45) Date of Patent: Mar. 30, 2004

(54) BALL SCREW

(75) Inventor: Takayuki Yabe, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/143,976

(22) Filed: May 14, 2002

(65) Prior Publication Data

US 2002/0170369 A1 Nov. 21, 2002

(30) Foreign Application Priority Data

May 15, 2001 (JP) ...................................... P.2001-144785

(51) Int. Cl.$^7$ ........................... F16H 27/02; F16H 29/02
(52) U.S. Cl. ...................... 74/89.44; 74/89.4; 74/89.26; 74/89.41
(58) Field of Search ................. 74/89.44, 89.4, 74/89.41, 89.35, 89.25, 89.26

(56) References Cited

U.S. PATENT DOCUMENTS

| 1,453,532 A | * | 5/1923 | Stevens | 74/467 |
|---|---|---|---|---|
| 2,606,454 A | * | 8/1952 | Westling | 74/89.44 |
| 2,708,374 A | * | 5/1955 | Engh | 74/89.44 |
| 3,220,277 A | * | 11/1965 | Dixon | 74/89.42 |
| 3,371,551 A | * | 3/1968 | Profet | 74/424.86 |
| 3,731,546 A | * | 5/1973 | MacDonald | 74/63 |
| 4,000,664 A | | 1/1977 | Christensen | |
| 4,630,866 A | * | 12/1986 | McFarlane | 297/362.14 |
| 5,809,838 A | | 9/1998 | Miyaguchi et al. | |
| 5,918,505 A | * | 7/1999 | Jensen | 74/89.26 |
| 6,089,113 A | * | 7/2000 | Sato et al. | 74/89.44 |

FOREIGN PATENT DOCUMENTS

| DE | 1 777 311 | 12/1971 |
|---|---|---|
| EP | 1 031 767 A1 | 8/2000 |
| EP | 1 067 315 A2 | 1/2001 |
| WO | WO 00/29764 | 5/2000 |

OTHER PUBLICATIONS

Japanese Abstract No. 11118017, dated Apr. 30, 1999.

* cited by examiner

Primary Examiner—David Fenstermacher
(74) Attorney, Agent, or Firm—Sughrue Mion, PLLC

(57) ABSTRACT

One end of a cylinder disposed on the outer periphery of a ball screw shaft is fixed to the end face of a ball nut, while the other end of the cylinder is closed by an end plate to thereby form a lubricant filling space between the end plate and the leading end face of the ball screw shaft. And, the lubricant is supplied into the lubricant filling space from a grease nipple mounted on the cylinder.

5 Claims, 3 Drawing Sheets

BALL SCREW

BACKGROUND OF THE INVENTION

The present invention relates to a ball screw and, in particular, to an improvement in lubricant supply means which supplies lubricant such as grease into between a ball screw shaft and a ball nut.

A ball screw for use in table feed apparatus is conventionally structured in such a manner as shown in FIG. 6. In FIG. 6, reference character 11 designates a ball screw shaft, 12 designates a ball nut, and 13 designates a plurality of balls serving as rolling elements. And, in the outer peripheral surface of the ball screw shaft 11, there are formed first spiral groove 14. On the other hand, in the inner peripheral surface of the ball nut 12, there are formed second spiral groove 15; and, the balls 13 are allowed to roll along rolling passages respectively formed between the second and first spiral grooves 15 and 14.

Also, in the interior portion of the ball nut 12, there are formed rolling body circulation passages (not shown). The balls 13 are allowed to roll repeatedly along the rolling passages which are formed between the first and second spiral grooves 14 and 15, and the rolling body circulation passages. Further, a pulley 16 is mounted on the ball nut 12, and, in case where the pulley 16 is rotated by a motor 19 through a belt 17 and another pulley 18, the balls 13 are allowed to roll repeatedly between the first and second spiral grooves 14 and 15. With the repeated rolling movements of the balls 13, the ball screw shaft 11 is moved in the axial direction thereof with respect to the ball nut 12. By the way, in FIG. 6, reference character 20 designates a seal member for sealing a clearance between the ball screw shaft 11 and ball nut 12.

In the above structured ball screw, in case where the ball screw shaft 11 and ball nut 12 are worn due to the rolling movements of the balls 13, since the feed accuracy of the ball screw is degraded, a grease nipple 21 is mounted on the ball nut 12. That is, lubricant such as grease is supplied from the grease nipple 21 into the interior portion of the ball nut 12 to thereby control the wear of the ball screw shaft 11 and ball nut 12. However, when the ball screw is used under a high load, an oil film is easy to break and thus the lubricant must be supplied frequently into the interior portion of the ball nut 12 in order to prevent such oil film breakage, which results in a large amount of lubricant used.

Also, conventionally, when filling grease into the ball nut 12 from the grease nipple 21, because the viscosity of the grease is high, the grease oozes out from the two ends of the ball nut 12 before the grease is filled in sufficiently. Further, even the grease filled into the interior portion of the ball nut 12 is also pushed out to the outside of the ball nut 12 due to the operation of the ball nut 12. Therefore, the peripheral portion of the ball nut 12 is soiled with the grease, which requires an extra amount of grease.

As described above, in the conventional ball screw, since the lubricant such as grease supplied into the interior portion of the ball nut 12 is pushed out to the outside of the ball nut 12 due to the rolling movements of the balls 13, the lubricant must be frequently supplied into the interior portion of the ball nut 12. This raises a problem that a large amount of lubricant is necessary to control the wear of the ball screw shaft and ball nut.

SUMMARY OF THE INVENTION

The present invention aims at eliminating the drawbacks found in the conventional ball screw. Accordingly, it is an object of the present invention to provide a ball screw which is capable of reducing the supply amount of lubricant to be supplied into the interior portion of a ball nut.

In attaining the above object, according to a first aspect of the present invention, there is provided a ball screw, comprising: a ball screw shaft having a first spiral groove formed in an outer periphery thereof; a ball nut having a second spiral groove formed in an inner periphery thereof for defining a rolling passage between the first spiral groove and the second spiral groove for spherical-shaped rolling elements; and a cylinder disposed on the outer periphery of the ball screw shaft, one end of the cylinder being fixed to an end face of the ball nut, and the other end of the cylinder being closed, wherein a lubricant filling space is formed between a leading end face of the ball screw shaft and the closed other end of the cylinder.

According to the first aspect of the present invention, in case where the leading end face of the ball screw shaft is made to approach the closed end portion of the cylinder, the lubricant filled into the lubricant filling space is pushed out from the lubricant filling space, and the lubricant is allowed to flow between the ball screw shaft and cylinder, then the lubricant is supplied into the interior portion of the ball nut. Therefore, the lubricant can be supplied into the interior portion of the ball nut without supplying the lubricant from a grease nipple mounted on the ball nut. That eliminates the need to fill and store an extra amount of lubricant in the interior portion of the ball nut, thereby being able to reduce the supply amount of lubricant to be supplied into the interior portion of the ball nut. And, there is also avoided the possibility that an extra amount of lubricant can be pushed out from the interior portion of the ball nut. In addition, it is possible to prevent the periphery of the ball nut from being soiled with the lubricant pushed out from the interior portion of the ball nut.

According to the present invention, as set forth in a second aspect of the present invention, by forming a lubricant discharge opening in an end portion of the ball nut situated on the opposite side to the cylinder, the lubricant supplied into the interior portion of the ball nut can be collected from the lubricant discharge opening.

Also, according to a third aspect of the present invention, there may be disposed a pipe passage disposed on the outside of the cylinder, for returning lubricant discharged from the lubricant discharge opening to the lubricant filling space; and a check valve disposed on the pipe passage, for restricting a flow of lubricant from the lubricant filling space to the lubricant discharge opening. According to this structure, the lubricant discharged from the lubricant discharge opening can be supplied again into the interior portion of the ball nut from the lubricant filling space.

Further, according to a fourth aspect of the present invention, by disposing a lubricant filtering unit on the middle portion of the pipe passage, polluting substances such as worn powder can be removed from the lubricant.

In addition, according to a fifth aspect of the present invention, in case where there is disposed a lubricant supply unit on the cylinder, for supplying lubricant into the lubricant filling space, the lubricant can be filled into the lubricant filling space easily.

DESCRIPTION OF THE PREFERRED EMBODIMENTS

Now, description will be given below of the preferred embodiments of a ball screw according to the present invention with reference to the accompanying drawings.

Figure 1:
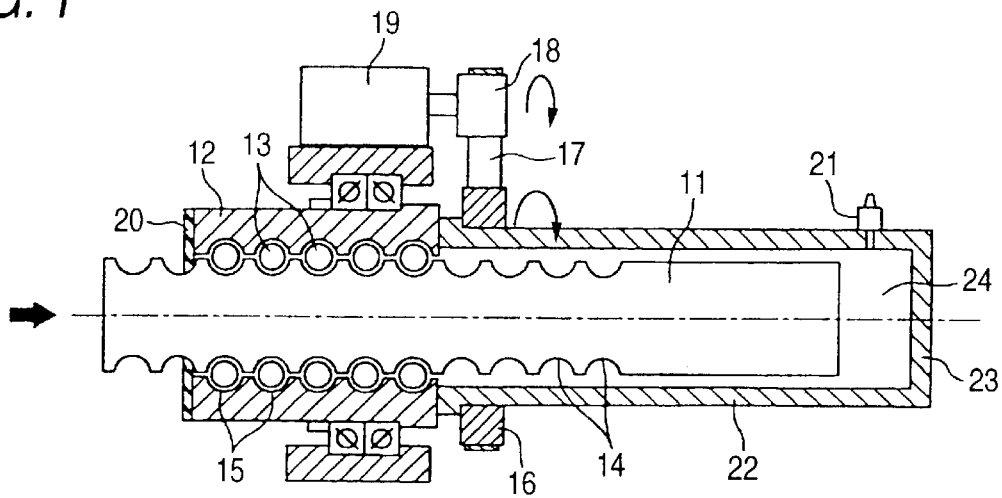
FIG. 1 is a schematic structure view of a first embodiment of a ball screw according to the present invention.

FIG. 1 shows a first embodiment of a ball screw according to the present invention. In FIG. 1, reference character 11 designates a ball screw shaft, 12 designates a ball nut, and 13 designates a plurality of balls serving as rolling elements; and, in the outer peripheral surface of the ball screw shaft 11, there are formed first spiral groove 14. On the other hand, in the inner peripheral surface of the ball nut 12, there are formed second spiral groove 15. That is, the balls 13 are allowed to roll along rolling passages which are respectively formed between the second and first spiral grooves 15 and 14. Also, in the interior portion of the ball nut 12, there are formed rolling body circulation passages (not shown). The balls 13 are allowed to roll repeatedly along the rolling passages which are formed between the first and second spiral grooves 14 and 15, and the rolling body circulation passages. Further, a pulley 16 is mounted on the ball nut 12, and, in case where the pulley 16 is rotated by a motor 19 through a belt 17 and another pulley 18, the balls 13 are allowed to roll repeatedly between the first and second spiral grooves 14 and 15. With the repeated rolling movements of the balls 13, the ball screw shaft 11 is moved in the axial direction thereof with respect to the ball nut 12. By the way, in FIG. 1, reference character 20 designates a seal member which seals a clearance between the ball screw shaft 11 and ball nut 12.

On the outer periphery of the ball screw shaft 11, there is disposed a cylindrical-shaped cylinder 22. One end of the cylinder 22 is fixed to the end face of the ball nut 12, whereby the cylinder 22 can be rotated integrally with the ball nut 12. On the other hand, the other end of the cylinder 22 is closed by an end plate 23. Between the end plate 23 serving as the closed end portion of the cylinder 22 and the leading end face of the ball screw shaft 11, there is formed a lubricant filling space 24. Into the lubricant filling space 24, there can be supplied lubricant such as grease from a grease nipple 21 which is disposed on the closed-side end portion of the cylinder 22 and is used as lubricant supply means (unit).

Next, description will be given below of the operation of the above structured ball screw with reference to FIGS. 2A and 2B.

Figure 2A:
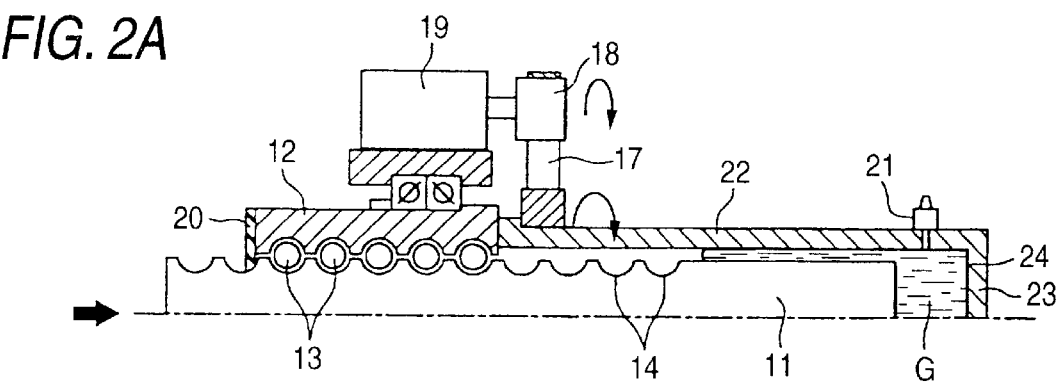
FIGS. 2A and 2B are explanatory views of the operation of the ball screw shown in FIG. 1.
Figure 2B:
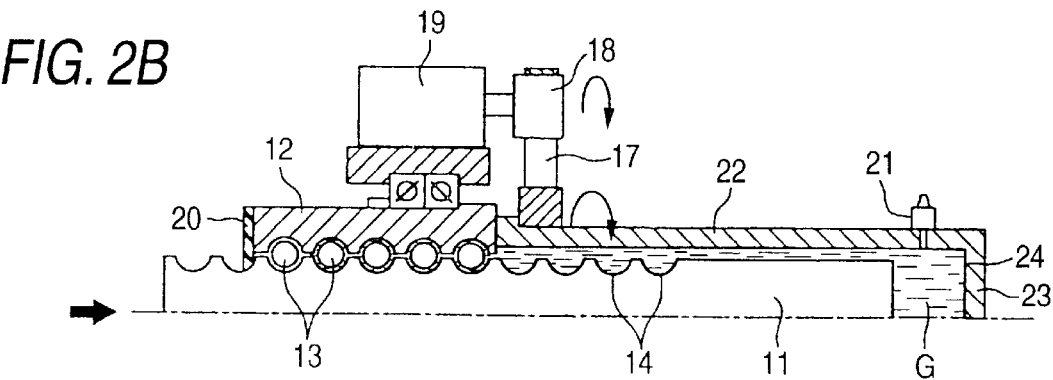

Referring to FIGS. 2A and 2B, FIG. 2A shows the state of the present ball screw in which lubricant G such as grease is filled into the lubricant filling space 24 from the grease nipple 21 disposed on the cylinder 22. In case where, from this state, the ball nut 12 and cylinder 22 are rotated by a motor 19 to thereby approach the leading end face of the ball screw shaft 11 toward the end plate 23, as shown in FIG. 2B, the lubricant G filled and stored in the lubricant filling space 24 is pushed out from the lubricant filling space 24. In this case, the lubricant G pushed out from the lubricant filling space 24 is made to flow between the ball screw shaft 11 and cylinder 22 and is then supplied into the interior portion of the ball nut 12. Therefore, even in case where the lubricant is not supplied from the grease nipple 21 mounted on the ball nut 12, the lubricant G can be supplied into the interior portion of the ball nut 12. Thus, according to the present embodiment, there is eliminated the need to fill and store an extra amount of lubricant in the interior portion of the ball nut 12, which can reduce the supply amount of the lubricant to be supplied into the interior portion of the ball nut 12. Also, since there is avoided the possibility that an extra amount of lubricant can be pushed out from the interior portion of the ball nut 12, the periphery of the ball nut 12 can be prevented from being soiled with the lubricant pushed out from the interior portion of the ball nut 12. Further, by adjusting the amount of the lubricant G pushed out from the lubricant filling space 24, the deteriorated lubricant G can be removed from the interior portion of the ball nut 12.

Figure 3:
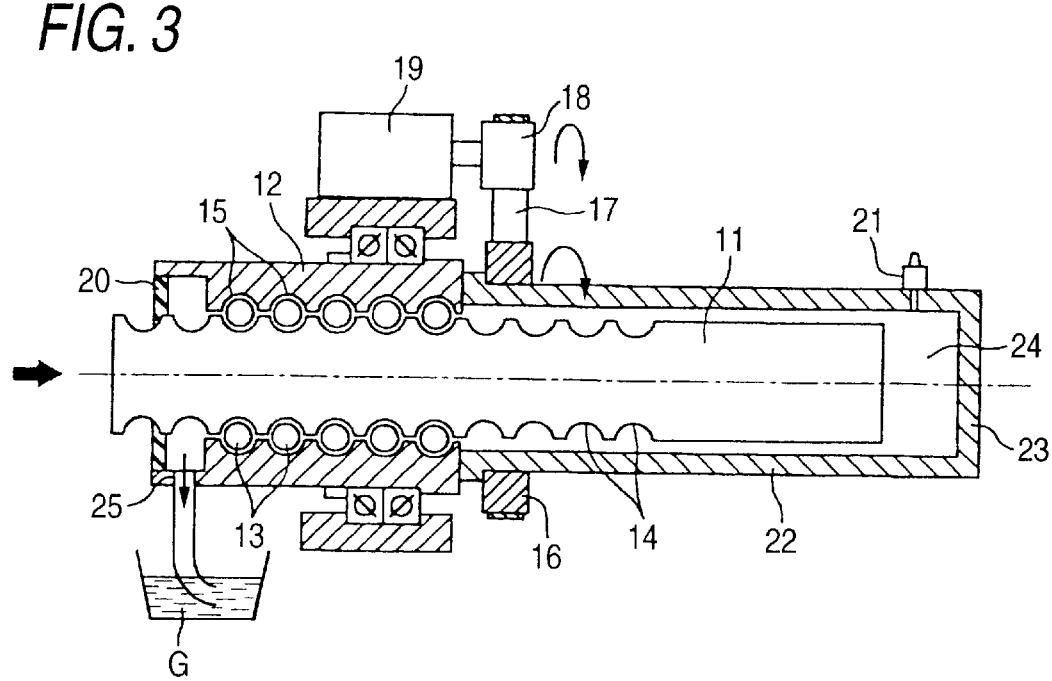
FIG. 3 is a schematic structure view of a second embodiment of a ball screw according to the present invention.

Now, FIG. 3 shows a schematic structure view of a second embodiment of a ball screw according to the present invention. The second embodiment is different from the previously-described first embodiment in that a lubricant discharge opening 25 is formed in the end portion of the ball nut 12 situated on the opposite side to the cylinder 22. The remaining portions of the second embodiment are similar in structure to the first embodiment.

In case where the lubricant discharge opening 25 is formed in the end portion of the ball nut 12 situated on the opposite side to the cylinder 22, the lubricant G supplied into the interior portion of the ball nut 12 can be discharged from the lubricant discharge opening 25. Thus the lubricant G supplied from the lubricant filling space 24 into the interior portion of the ball nut 12 can be collected. Also, due to the formation of the lubricant discharge opening 25 in the end portion of the ball nut 12 situated on the opposite side to the cylinder 22, the old lubricant within the ball nut 12 can be discharged from the lubricant discharge opening 25. it is possible to clean the interior portion of the ball nut 12 with the lubricant. According to the second embodiment, in case where the structure is arranged such that new lubricant is allowed to start flowing at and from the large load distribution area of the interior portion of the ball nut 12, there can be obtained a better cleaning effect.

Figure 4:
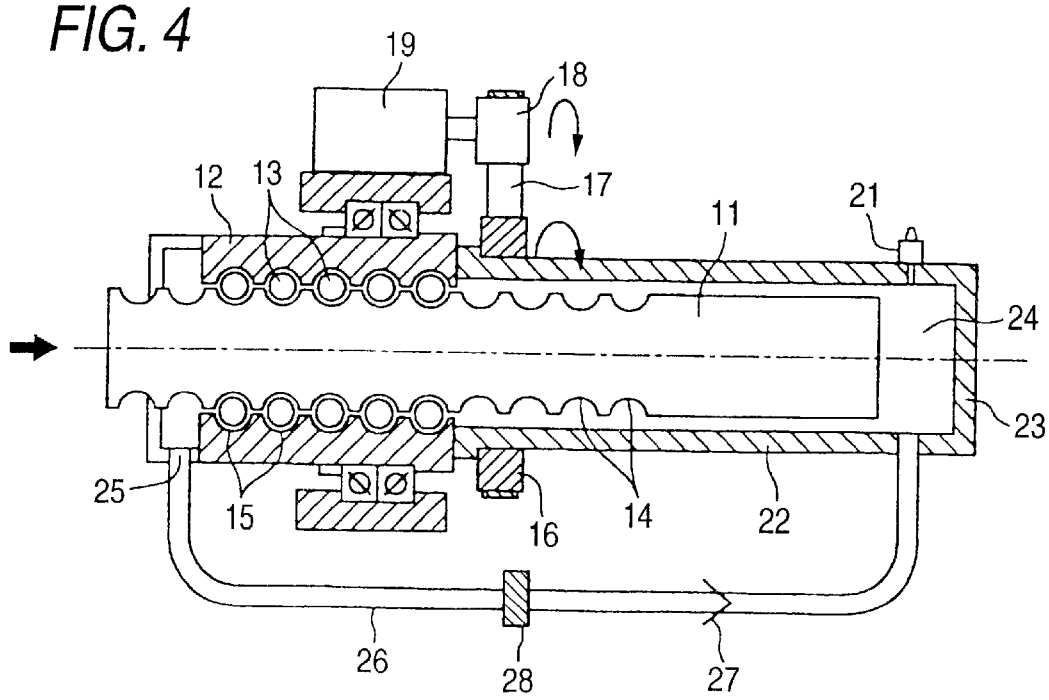
FIG. 4 is a schematic structure view of a third embodiment of a ball screw according to the present invention.

Now, FIG. 4 shows a schematic structure view of a third embodiment of a ball screw according to the present invention. The third embodiment is different from the previously-described second embodiment in that a pipe passage 26 for returning the lubricant discharged from the lubricant discharge opening 25 to the lubricant filling space 24 is formed on the outside of the cylinder 22. In addition, on portions of the pipe passage 26, there are disposed a check valve 27 and a filter 28 which is used as lubricant filtering means (unit). The remaining portions of the third embodiment are similar in structure to the second embodiment.

According to the present structure, since the lubricant discharged from the lubricant discharge opening 25 is returned through the pipe passage 26 to the lubricant filling space 24, the lubricant discharged from the lubricant discharge opening 25 can be supplied again into the interior portion of the ball nut 12. Also, the provision of the filter 28 on the pipe passage 26 makes it possible to remove polluting substances such as worn powder from the lubricant.

Figure 5:
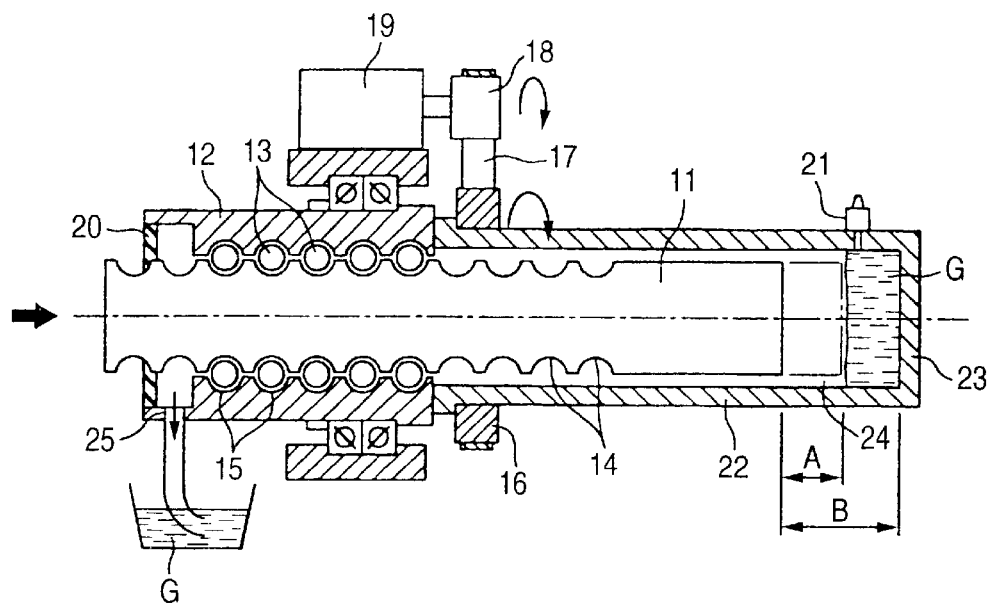
FIG. 5 is a schematic structure view of a fourth embodiment of a ball screw according to the present invention; and, FIG. 6 is a schematic structure view of a conventional ball screw.
Figure 6:
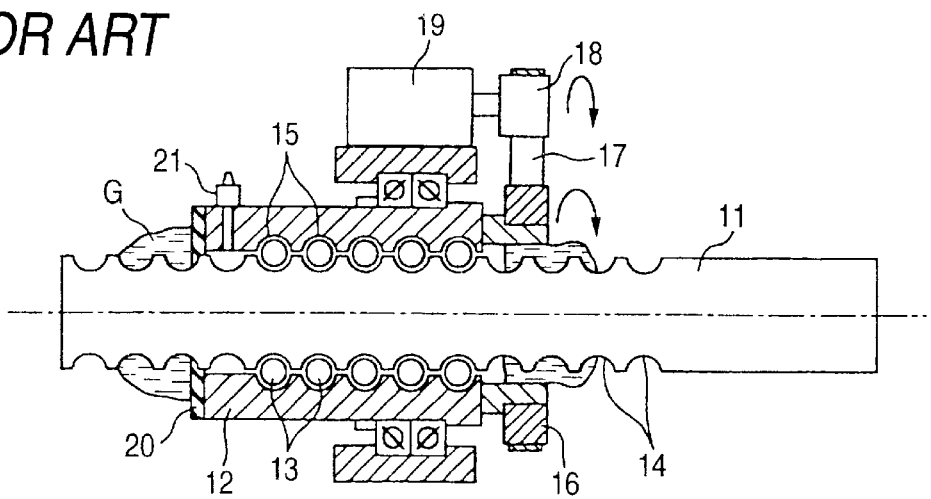

In the above-mentioned respective embodiments, the lubricant G filled into the lubricant filling space 24 is pushed out from the lubricant filling space 24, and the lubricant G is then supplied into the interior portion of the ball nut 12. However, as in a fourth embodiment of the present invention shown in FIG. 5, the lubricant G may be previously filled and stored into a space between stroke A (the normal stroke range of the ball screw shaft 11) and stroke B (the stroke of the ball screw shaft 11 in the lubricant supply time thereof) of the lubricant filling space 24. Then, as the need for the lubricant arises, the ball screw shaft 11 may be moved or stroked up to stroke B in FIG. 5 to thereby supply the lubricant G into the interior portion of the ball nut 12.

As has been described heretofore, according to the first aspect of the present invention, the lubricant can be supplied into the interior portion of the ball nut without supplying the lubricant from the grease nipple mounted on the ball nut. This eliminates the need to fill and store an extra amount of lubricant in the interior portion of the ball nut, thereby being able to reduce the supply amount of lubricant to be supplied into the interior portion of the ball nut. And, there is also avoided the possibility that an extra amount of lubricant can be pushed out from the interior portion of the ball nut, which can prevent the periphery of the ball nut from being soiled with the lubricant pushed out from the interior portion of the ball nut.

And, according to the second aspect of the present invention, in addition to the effects by the first aspect of the present invention, the lubricant discharged from the lubricant discharge opening can be supplied again into the interior portion of the ball nut from the lubricant filling space.

Also, according to the third aspect of the present invention, in addition to the effects by the second aspect of the present invention, the lubricant discharged from the lubricant discharge opening can be supplied again into the interior portion of the ball nut from the lubricant filling space.

Further, according to the fourth aspect of the present invention, in addition to the effects by the third aspect of the present invention, polluting substances such as worn powder can be removed from the lubricant.

Moreover, according to the fifth aspect of the present invention, in addition to the effects by the first aspect of the present invention, the filling operation of the lubricant into the lubricant filling space can be facilitated.

What is claimed is:

1. A ball screw, comprising:
   a ball screw shaft having a first spiral groove formed in an outer periphery thereof;
   a ball nut having a second spiral groove formed in an inner periphery thereof for defining a rolling passage between the first spiral groove and the second spiral groove for spherical-shaped rolling elements; and
   a cylinder disposed on the outer periphery of the ball screw shaft, one end of the cylinder being fixed to an end face of the ball nut, and the other end of the cylinder being closed,
   wherein a lubricant filling space is formed between a leading end face of the ball screw shaft and the closed other end of the cylinder, and
   lubricant filled within the lubricant filling space in order to be supplied to an interior portion of the ball nut.

2. The ball screw as set forth in claim 1, wherein a lubricant discharge opening is formed in an end portion of the ball nut situated on the opposite side to the cylinder.

3. A ball screw, comprising:
   a ball screw shaft having a first spiral groove formed in an outer periphery thereof;
   a ball nut having a second spiral groove formed in an inner periphery thereof for defining a rolling passage between the first spiral groove and the second spiral groove for spherical-shaped rolling elements; and
   a cylinder disposed on the outer periphery of the ball screw shaft, one end of the cylinder being fixed to an end face of the ball nut, and the other end of the cylinder being closed,
   wherein a lubricant filling space is formed between a leading end face of the ball screw shaft and the closed other end of the cylinder,
   wherein a lubricant discharge opening is formed in an end portion of the ball nut situated on the opposite side to the cylinder,
   a pipe passage disposed on the outside of the cylinder, for returning lubricant discharged from the lubricant discharge opening to the lubricant filling space; and
   a check valve disposed on the pipe passage, for restricting a flow of lubricant from the lubricant filling space to the lubricant discharge opening.

4. The ball screw as set forth in claim 3, further comprising:
   a lubricant filtering unit disposed on the middle portion of the pipe passage.

5. A ball screw, comprising:
   a ball screw shaft having a first spiral groove formed in an outer periphery thereof;
   a ball nut having a second spiral groove formed in an inner periphery thereof for defining a rolling passage between the first spiral groove and the second spiral groove for spherical-shaped rolling elements;
   a cylinder disposed on the outer periphery of the ball screw shaft, one end of the cylinder being fixed to an end face of the ball nut, and the other end of the cylinder being closed,
   wherein a lubricant filling space is formed between a leading end face of the ball screw shaft and the closed other end of the cylinder; and
   further comprising:
   a lubricant supply unit disposed on the cylinder, for supplying lubricant into the lubricant filling space.

* * * * *